Feb. 28, 1956          P. J. SELGIN          2,736,853
INDUCED QUADRATURE FIELD MOTOR
Filed Nov. 25, 1953

INVENTOR.
Paul J. Selgin
BY Max L. Libman
Attorney

United States Patent Office 2,736,853
Patented Feb. 28, 1956

2,736,853

INDUCED QUADRATURE FIELD MOTOR

Paul J. Selgin, Washington, D. C.

Application November 25, 1953, Serial No. 394,359

7 Claims. (Cl. 318—165)

This invention relates to alternating-current motors having the general characteristics of synchronous motors, and has for its primary object the provision of a motor having higher output at lower speed than a conventional alternating-current motor of similar physical size.

A major object of the invention is to provide a motor which will run at a speed which bears a definite relation to the frequency of the supplied current; another object is to provide such a motor which by a simple circuit change can be made to run at a number of such definite speeds, and which is self-starting. More specifically, it is an object to provide such a motor whose synchronous speed is one-quarter the synchronous speed of a capacitor-type induction motor having the same number of poles.

A further object is the provision of an improved synchronous motor which has no brushes, slip-rings or permanent magnets, is of extremely simple and inexpensive construction and requires no winding or conductors in the rotor. Still another object is to provide a motor having a considerably smaller size, and particularly, diameter, than a conventional brushless alternating-current motor of the same output and speed.

The specific nature of the invention, as well as other objects and advantages thereof, will clearly appear from a description of a preferred embodiment as shown in the accompanying drawing, in which:

Figs. 4–1 to 4–6 are a series of diagrams showing various rotor positions used in conjunction with Fig. 5 which is a graph used in explaining the principle of operation of the invention;

Fig. 6 is a diagram showing the use of a number of condensers for obtaining various speeds.

Figure 1:
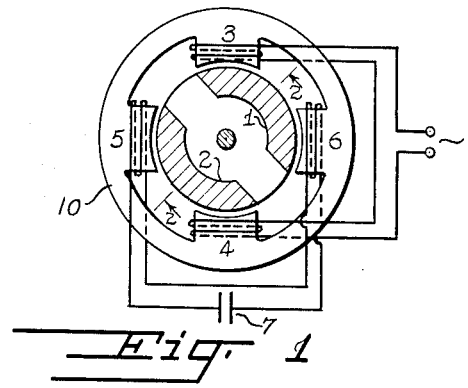
Fig. 1 is a schematic drawing illustrating the basic principle of the invention.
Figure 2:
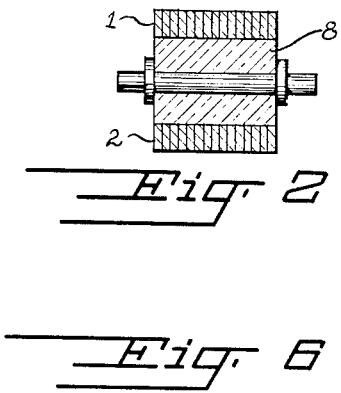
Fig. 2 is a sectional view of the rotor taken on line 2—2 of Fig. 1.

One form of my invention is shown in Fig. 1. The stator 10 has four poles in the form shown but could have any even number of poles. The rotor consists of two segments and generally the number of segments is one-half the number of poles. The segments, 1 and 2, are made of laminations as shown in Fig. 2, but each segment is magnetically separated by a body 8 of suitable material, preferably insulating material. For convenience in manufacturing and assembly, in some cases the laminations for segments 1 and 2 could be stamped of one piece joined by a thin strip of material 2a (Fig. 3), but as such a strip would provide a relatively high reluctance magnetic path, it would not affect the substantial magnetic independence of segments 1 and 2. The stator 10 is also preferably of conventional laminated construction.

Only two of the poles, 3 and 4, are magnetized directly by the line current. These poles are called the exciting poles and their windings, which form one circuit, are jointly called the line winding. In describing the motor only the exciting poles are counted, similarly to induction motor practice where only the "in phase" poles are counted. Thus, the motor shown is called a two-pole motor.

Figure 3:
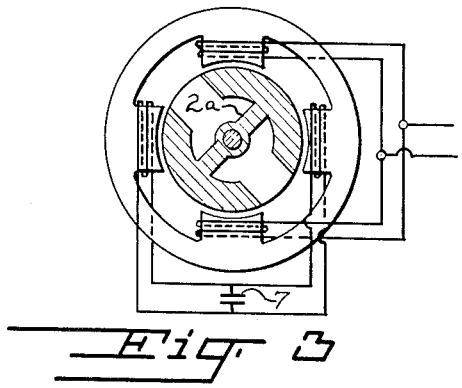
Fig. 3 is a schematic drawing of a 4-pole motor according to the invention, using parallel connections.

The remaining two poles, 5 and 6, are called "quadrature poles" and their winding, connected together, are jointly called the "quadrature winding." Windings of poles 5 and 6 are shown series-connected, as are windings 3 and 4, but parallel connection is possible in both cases, as shown in Fig. 3.

The magnetic field under the quadrature poles is called "quadrature field" and the motor derives its name from the fact that this field is induced by virtue of the magnetization of the exciting poles, since the quadrature windings have no direct access to the source of energy, but are connected across a capacitor 7, of suitable value.

The principle of operation can be understood best by assuming at first that direct current of constant value is fed to the line winding and that the motor is driven by some outside agent at constant speed.

Figure 4:
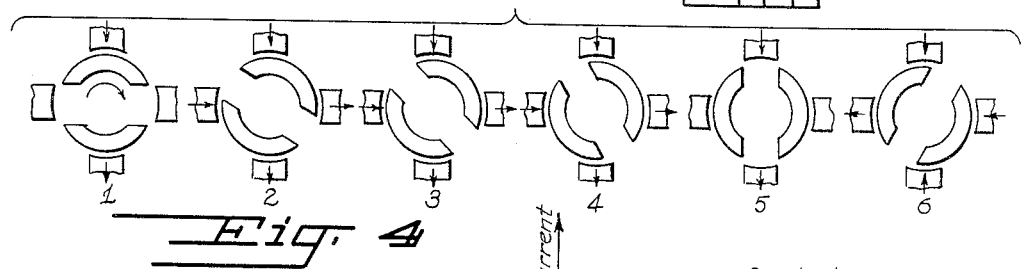

Fig. 4 shows six successive positions of the armature. While the flux through the line windings, due to the direct current, has constant direction, the quadrature flux varies and inverts as the armature rotates. In position 1 the quadrature flux is zero because the same flux enters and leaves each quadrature pole. In position 2 the quadrature flux is directed from left to right; in position 3 it is still from left to right but has greater value because the reluctance is less; in position 4 the flux is the same as in position 2; in position 5 it is again zero; in position 6 it has the same value as in positions 2 and 4, but is directed from right to left; and so on.

Figure 5:
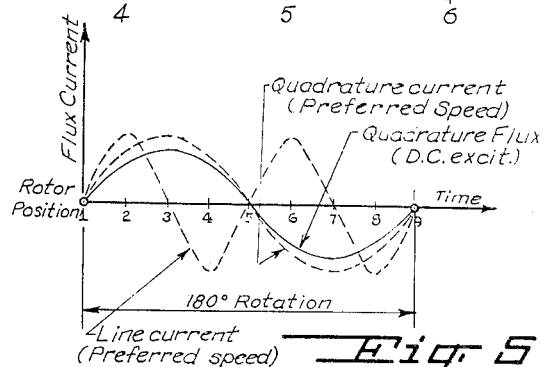

Fig. 5 is a graph showing variations of flux through the quadrature winding during a full rotation of the armature, assuming constant direct current in the line winding. This curve may be assimilated to a sinusoid for practical purposes. In this way it may be expressed mathematically and variations of the quadrature flux may be computed when the line winding is excited with alternating current.

We therefore represent the solid line curve of Fig. 5 by the equation:

(1) $$\phi_Q = K_1 I_L \sin 2\omega_R t$$

where $t$ is the time in seconds, $I_L$ the current in the line winding, $\phi_Q$ the quadrature flux, $K_1$ a constant depending on the design of the motor, and $\omega_R$ the angular velocity of the armature in radians per second. The factor 2 is due to the fact that the quadrature flux goes through a complete cycle while the armature makes half a turn.

If the line winding current is alternating current we replace $I_L$ by another sine function of angular frequency $\omega_L$ (line frequency) and obtain:

(2) $$\phi_Q = [K_1 \hat{I}_L \sin (\omega_L t + \theta_L)] \cdot \sin 2\omega_R t$$

$\theta_L$ is a phase-shift depending on the angle of the armature when the line current has zero phase.

The last equation may be expanded through trigonometric relations as follows:

(3)
$$\phi_Q = \frac{K_1 \hat{I}_L}{2} \{\cos [(\omega_L - 2\omega_R)t + \theta_L] - \cos [(\omega_L + 2\omega_R)t + \theta_L]\}$$

showing that the quadrature flux now consists of two components of "sum" and "difference" frequencies.

In practice, the value of capacitor 7, Fig. 1, is such that the "sum" component is discriminated against because the quadrature circuit is highly inductive at this frequency, so that the quadrature current is largely due to the "difference" component and has frequency $\omega_L - 2\omega_R$.

This quadrature current having "difference" frequency will produce a certain value of flux which may be called "secondary" flux to distinguish it from the "primary" flux evaluated above. The secondary flux which passes through the line winding may be computed by using the information of Fig. 3, and the corresponding equation, in reverse. This equation can be used indifferently to compute the quadrature flux due to the quadrature current.

Thus we find for the secondary flux through the line winding:

(4)
$$\phi_L' = \frac{K_1^2 K_2 \hat{I}_L}{2} [\cos (\omega_L - 2\omega_R)t + \theta_L + \theta_Q] \cdot \sin 2\omega_R t$$

Again we may expand through trigonometric formulas and write:

(5)
$$\phi_L' =$$
$$\frac{K_1^2 K_2 \hat{I}_L}{4} \{\sin (\omega_L t + \theta_L + \theta_Q) - \sin [(\omega_L - 4\omega_R)t + \theta_L + \theta_Q]\}$$

where $\theta_Q$ is the phase angle between quadrature flux and quadrature current, and $K_2$ a constant.

The secondary flux which links with the line winding is seen to consist also of two components. Of these, one has the line frequency $\omega_L$, the other has frequency $\omega_L - 4\omega_R$. These two components will cause an electromotive force, of the type that has been called "back E. M. F." in machine terminology, to appear across the line winding. This E. M. F. will interact with the line current, giving rise to an inflow or outflow of power. More precisely, the E. M. F. due to the first component, of line frequency, will be associated with such an exchange of power, the other will produce no net flow of power over an extended period of time.

If the phase of the first component, or line frequency component, is such as to produce an inflow of power into the motor, the motor will continue its rotation after the outside motive power is removed, even if a mechanical load is applied.

So far, nothing has been said to indicate that the motor will turn synchronously. In fact, it is possible for the motor to exhibit torque when out of synchronism, as the preceding equations show; this is an advantage, for example, during the starting period.

There is an additional factor, however, which has been overlooked so far and which tends to make the motor lock into a particular synchronous speed, or "preferred" speed.

It is well known that an electromagnet with variable gap exerts strong forces tending to close or minimize this gap. In general, the forces are such as to favor a configuration giving the magnetic field its maximum energy, or, which is the same thing, minimum reluctance, when the magnet is energized.

If the electromagnet is excited by alternating current and its reluctance changes periodically through rotation of a yoke or armature, the period of rotation will tend to be such that minimum values of reluctance occur at the same instants as maximum values of current, and conversely, maximum reluctance corresponds with zero current. From this line of reasoning we see that the period of rotation of the motor illustrated, as well as the frequency and phase of the predominant component of quadrature current, will tend to be such that the condition of maximum reluctance at zero current (rotor positions 1 and 5) is respected all the way around.

This state of affairs is illustrated by the dotted lines of Fig. 5, showing the line and quadrature currents when the motor runs unloaded at its preferred synchronous speed.

We note that in this case the period of rotation is four times the period of the line current, for the two-pole motor illustrated (for a four-pole motor it would be eight times the line period, and so on). Accordingly:

(6)
$$\omega_L = 4\omega_R$$

and therefore the quadrature current has the frequency:

(7)
$$\omega_Q = \omega_L - 2\omega_R = \tfrac{1}{2}\omega_L$$

which also agrees with the dotted curves of Fig. 5. And finally, in Equation 5 giving the two components of "secondary" flux, hence of back E. M. F., we find that in the present case the frequency of the second, or ineffective, component, becomes zero. Physically, this results in some direct current magnetization of the frame.

Equation 7 can be written:

$$\omega_R = \frac{\omega_L}{2+N}$$

which means that the motor has many possible synchronous speeds, fairly close to one another. In general, for 60 cycle line frequency, for the motor of Fig. 1:

$$\text{R. P. M.} = \frac{3600}{2+N}$$

The speed range of the motor depends, for a given frequency, on the value of the secondary capacitor, which in effect provides frequency tuning for the secondary circuit. The range of capacitance values for which the motor will turn is wide but has rather definite limits, in a typical case being from 24 to 8 microfarads.

The dotted lines of Fig. 5, compared with the positions of Fig. 4, show clearly that in the "preferred" operation positions of maximum reluctance coincide with zero values of both the line and quadrature currents. Hence the motor exhibits a strong locking tendency at this frequency. It should be noted that other configurations would permit the same locking action to exist, but such configurations also tend to stall permanently in the position of minimum reluctance. This is not true of the motor in question, due to its ability to supply torque at any speed.

The preferred period of rotation of the motor was found to be four times the line period, for a motor having two poles excited by the line, and four poles altogether. A similar motor of the split-phase induction type would have rotation period equal to the line period, except for slip. Neglecting the slip, which under certain conditions can be made zero in induction motors of the so-called "synchronous" variety, the subject motor is four times slower than a split-phase induction motor of substantially equal construction, except for the armature which in the subject motor carries no conductors whatever. This in turn means that for the same speed, the number of physical poles, hence the frame diameter, is considerably less in the subject motor as compared to the widely used split-phase-induction type.

Consequently, the subject motor can be directly coupled to its load when the required speed is such that a conventional motor would have to have too many poles and too large a diameter to be economically feasible and fit within the required dimensions.

Figure 6:
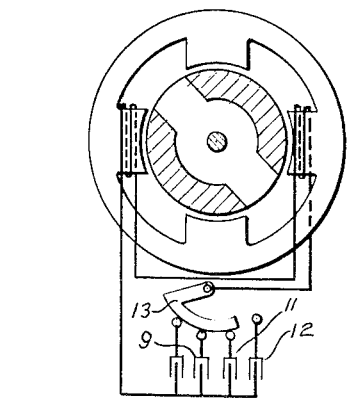

Fig. 6 shows the use of several condensers 9, 11 and 12 arranged to be cumulatively switched in by means of switch 13 to select various "preferred" speeds of operation as indicated by the graph of Fig. 5. In this way a number of operational speeds can be made available with a simple electrical control. Switch 13 may be either manually or automatically controlled.

When the line frequency is very high, as in aircraft use, the conventional induction motor runs at very high speed, requiring extensive reduction mechanisms, careful lubrication, and developing large kinetic energy. The possibility of reducing the speed by a factor of four while retaining the same number of windings and actually lessening the weight and cost of the armature, paves the way towards improved performance and greater economy.

The truly synchronous performance of my motor at high value of torque offers many advantages when constant speed is required in spite of load variations.

It should be noted that in addition to the preferred synchronous speed other synchronous speeds are possible, as they also fulfill to a degree the condition of minimum reluctance with minimum current. If the value of capacitor 7 (Fig. 1) is appropriately chosen, the motor will select one of these "modes" in place of the preferred speed. It is therefore possible to control the speed of the motor within fairly wide limits by merely changing the value of capacitor 7.

Figure 7:
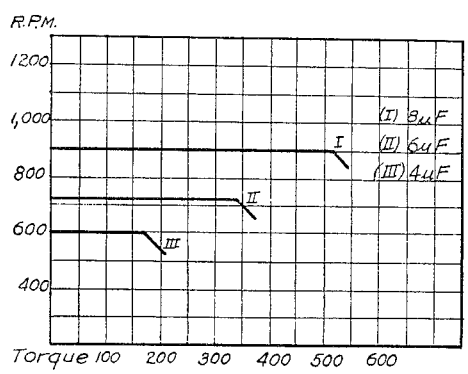
Fig. 7 is a graph showing performance characteristics of a typical motor according to the invention.

Curves of torque and imput and output power vs. speed are shown in Fig. 7.

It will be apparent that the embodiments shown are only exemplary and that various modifications can be made in construction and arrangement within the scope of my invention as defined in the appended claims.

I claim:

1. An alternating-current motor having a stator comprising two sets of circumferentially disposed poles, a primary winding on at least one of said sets arranged for connection to an alternating-current source, an independent winding on the other set connected in circuit relation with a capacitive reactance to form a composite secondary winding, and a rotor having a number of magnetic pole pieces each of sufficient arcuate extent to establish a low-reluctance magnetic circuit between two poles of respective sets when rotated to a position adjacent said two poles, there being otherwise only a high-reluctance magnetic path between the respective pole pieces of the rotor.

2. An alternating-current motor having a stator comprising two sets of alternately disposed pole-pairs, a primary winding on at least one of said sets of pole-pairs arranged for connection to an alternating-current source, an independent winding on the other set of pole-pairs connected in circuit relation with a capacitive reactance to form a composite secondary winding, and a rotor having a number of magnetically substantially independent pole pieces each of sufficient arcuate extent to establish a low reluctance magnetic circuit between two adjacent pole pieces.

3. The invention according to claim 1, the spacing between adjacent stator pole pieces being uniform.

4. The invention according to claim 3, the number of poles in each set being equal.

5. The invention according to claim 4, the several primary windings being connected in series and the several secondary windings being connected in series with each other and with said capacitive impedance.

6. The invention according to claim 5, the several primary windings being connected in parallel with the alternating-current source, and the several secondary windings being connected with said capacitive impedance.

7. The invention according to claim 1, said capacitive reactance being selectively variable, whereby the resonant frequency of the secondary circuit may be controlled.

References Cited in the file of this patent
UNITED STATES PATENTS

| | | |
|---|---|---|
| 1,580,477 | Fortescue | Apr. 13, 1926 |
| 1,773,074 | Borreson | Apr. 12, 1930 |